Patented Nov. 25, 1930

1,782,966

UNITED STATES PATENT OFFICE

HANS JORDAN, OF BERLIN-STEGLITZ, GERMANY, ASSIGNOR TO CHEMISCHE FABRIK AUF ACTIEN (VORM. E. SCHERING), OF BERLIN, GERMANY

PRODUCTION OF ALKYLATED PHENOLS

No Drawing. Application filed July 12, 1926, Serial No. 122,031, and in Germany July 4, 1925.

My invention refers to the production of alkylated phenols.

I have found that alkylated phenols can be obtained by treating a product of condensation of a ketone and a phenol having the formula

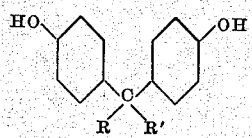

wherein R and R' are alkyl or aryl radicals, with hydrogen in the presence of a catalyst in such manner that the molecule of the condensation product is split up at the point where the ketone connects the two phenol radicals. This operation is preferably carried out by treating the product of condensation with hydrogen in the presence of a catalyst until two hydrogen atoms have been fixed. The alkylated phenols obtainable in this manner have the formula

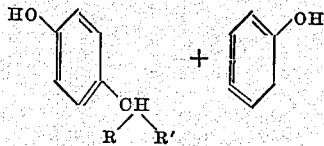

I have further found that a nickel catalyst containing bismuth and which acts slowly so as not to cause a further hydrogenation of the phenols obtained is particularly suitable.

In practicing my invention I prefer proceeding for instance as follows:

Example 1

100 parts by weight of p-dihydroxy diphenyl dimethyl methane are treated at about 160° C. with hydrogen under pressure in the presence of 1 to 3 parts of a nickel catalyst containing bismuth, until two hydrogen atoms have been fixed. There is formed p-isopropyl phenol and phenol, which can easily be separated from each other by distillation.

Example 2

4-dihydroxy-3-dimethyl diphenyl dimethyl methane (see Unverzagt's dissertation "Ueber die Einwirkung von Brom auf Di-p-oxytolyl-dimethylmethan", published at Marburg in 1904, page 24) is treated with hydrogen under pressure in the presence of a nickel catalyst containing bismuth substantially as described with reference to Example 1. The products obtained are 2-methyl-4-isopropyl phenol and o-cresol.

Example 3

By treating p-dihydroxydiphenyl methyl ethyl methane as described with reference to Example 1 there is obtained p-isobutyl phenol and phenol.

Various changes may be made in the details of the operation and particularly in the proportions of the ingredients without departing from the invention or sacrificing the advantages thereof.

I claim:—

1. The method of producing alkylated phenols comprising subjecting a dihydroxy-diphenyl methane derivative having the formula

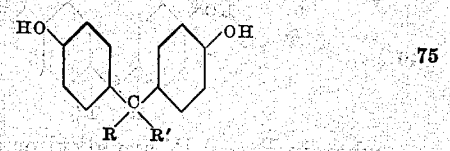

wherein R and R' are alkyl or aryl radicals at a temperature not materially exceeding 160° C. to treatment with hydrogen in the presence of a slow acting hydrogenation catalyst whereby the molecule of the compound is split up at the point where the carbon atom connects the two phenol radicals.

2. The method of producing alkylated phenols comprising subjecting a dihydroxy-diphenyl methane derivative having the formula

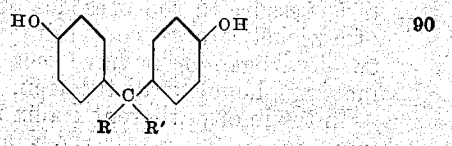

wherein R and R' are alkyl or aryl radicals, at a temperature not materially exceeding 160° C. to treatment with hydrogen in the presence of a slow acting hydrogenation catalyst until two hydrogen atoms have been fixed.

3. The method of producing alkylated phenols comprising subjecting a dihydroxy-diphenyl methane derivative having the formula

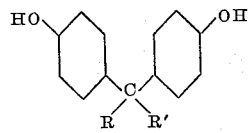

wherein R and R' are alkyl or aryl radicals, at a temperature not materially exceeding 160° C. to treatment with hydrogen in the presence of a slow acting mixed hydrogenation catalyst whereby the molecule of the compound is split up at the point where the carbon atom connects the two phenol radicals.

4. The method of producing alkylated phenols comprising subjecting a dihydroxy-diphenyl methane derivative having the formula

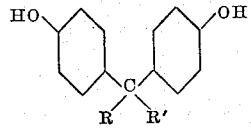

wherein R and R' are alkyl or aryl radicals, at a temperature not materially exceeding 160° C. to treatment with hydrogen in the presence of a slow acting hydrogenation catalyst containing bismuth whereby the molecule of the compound is split up at the point where the carbon atom connects the two phenol radicals.

5. The method of producing alkylated phenols comprising subjecting a dihydroxy-diphenyl methane derivative having the formula

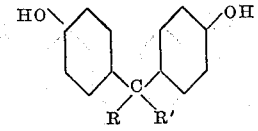

wherein R and R' are alkyl or aryl radicals, at a temperature not materially exceeding 160° C. to treatment with hydrogen in the presence of a nickel catalyst containing bismuth whereby the molecule of the compound is split up at the point where the carbon atom connects the two phenol radicals.

6. The method of producing p-isopropyl phenol comprising treating 100 parts by weight of p-dihydroxy-diphenyl dimethyl methane at about 160° C. with hydrogen under pressure in the presence of 1 to 3 parts of a nickel catalyst containing bismuth until two hydrogen atoms have been fixed, and removing phenol by distillation.

In testimony whereof I affix my signature.

HANS JORDAN.